Patented Dec. 13, 1932

1,891,148

UNITED STATES PATENT OFFICE

WILHELM ECKERT AND HEINRICH SIEBER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

HALOGENATION PRODUCT OF THE KETIMIDES OF ACENAPHTH-PERI-INDANDIONE AND ITS DERIVATIVES

No Drawing. Application filed March 19, 1931, Serial No. 523,936, and in Germany March 26, 1930.

The present invention relates to halogenation products of the ketimides of acenaphthperi-indandione and its derivatives.

French Patent No. 702,612 teaches that new cyclic ketones probably of the following constitution:

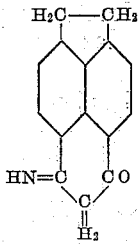

wherein the naphthalene residue may contain as substituents, for instance, halogen, hydroxy-, alkoxy-, or the like or salts thereof are obtained by treating with a condensing agent capable of effecting ring closure the products which may be obtained by causing cyano-acetyl chloride to act upon acenaphthene or a derivative thereof. (cf. French Patent No. 702,466.)

Now, we have found that new highly halogenated products are obtainable by treating the said cyclic ketones, in an acid or neutral medium, with a halogenating agent such as potassium chlorate and hydrochloric acid, sulfuryl chloride, gaseous chlorine, bromine or the like. The new products have the following probable constitution:

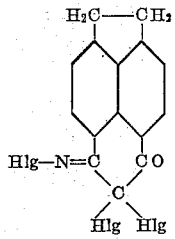

wherein Hlg stands for a substituent of the group consisting of Cl and Br and wherein the naphthalene nucleus may contain substituents. The new derivatives are very labile; when heated, for instance, in a solvent such as glacial acetic acid, they are converted into the corresponding dihalogen-acenaphthperi-indandiones of the probable formula:

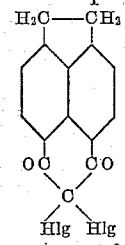

The new products are useful as intermediate products for the manufacture of dyestuffs.

The following examples serve to illustrate the invention but they are not intended to limit it thereto, the parts being by weight:

(1) 50 parts of the ketimide of acenaphthperi-indandione, of the probable formula:

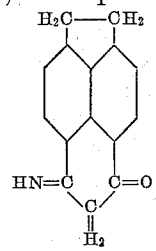

are dispersed, as finely as possible, in 2000 parts of water. Chlorine gas is introduced at room temperature until the color of the solution which is at first orange has become yellowish white. The compound is filtered with suction, washed until neutral and dried. It has the probable formula:

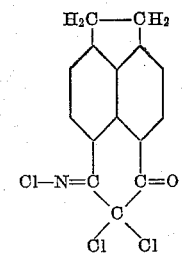

It melts at about 180° C. with evolution of gas and dissolves in concentrated sulfuric acid to a red solution. By heating the compound in the presence of dilute caustic soda solution, it gradually dissolves. By heating it, for instance, in glacial acetic acid, there is obtained the double chlorinated acenaphth-indandione of the probable formula:

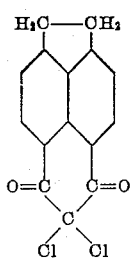
(III)

The new product crystallizes from glacial acetic acid in quadrangular feebly yellow prisms. It decomposes at temperatures from 160° C. and, after addition of dilute caustic soda solution and warming, it dissolves with decomposition. It contains 24.6% of chlorine and 0% of nitrogen.

(2) 20 parts of the ketimide of acenaphth-peri-indandione of the probable Formula I of Example 1 are finely dispersed in a mixture of about 120 parts of concentrated hydrochloric acid and 100 parts of water. 10 parts of potassium chlorate are introduced gradually at about 20° C.–30° C. After about 3 hours the chlorination is finished. The body behaves like that of Formula II of Example 1.

(3) 10 parts of the sulfate of the ketimide of acenaphth-peri-indandione of the following formula:

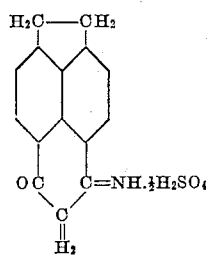

are suspended in a mixture of about 60 parts of concentrated hydrochloric acid and 50 parts of water and the whole is gradually mixed at room temperature with about 5 parts of potassium chlorate. After the reaction is finished, the feebly yellow chlorination product thus obtained is filtered by suction, washed until neutral and dried. It dissolves in concentrated sulfuric acid to a red solution which does not show the green fluorescence shown by the parent material; it melts with decomposition at 200° C.

The new compound is probably identical with the product of Formula II of Example 1.

(4) 15 parts of the hydrochloride of the ketimide of acenaphth-peri-indandione of the following formula:

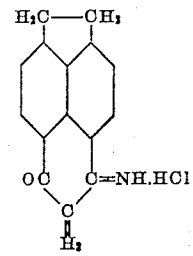

are suspended in about 127 parts of ethylene chloride. There are gradually added, drop by drop, at a temperature of 60° C.–70° C. about 25 parts of sulfuryl chloride. The temperature is maintained at the aforesaid value until the solution, which is at first yellow, has become white. The chlorination product is filtered by suction, washed by means of ethylene chloride and dried. It probably has the constitution of the compound of Formula II of Example 1.

(5) 5 parts of the hydrochloride of the ketimide of 3-chloro-acenaphth-peri-indandione of the formula:

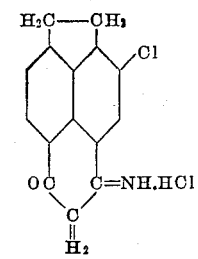

are dispersed, as finely as possible, in a solution prepared by diluting about 30 parts of concentrated hydrochloric acid with 25 parts of water, and the dispersion is mixed with about 2.5 parts of potassium chlorate. The reaction temperature is 20° C.–30° C. The reaction is completed after the mass has been well stirred for about 2–3 hours. The yellowish white chlorination product is filtered by suction, washed until neutral and dried. It melts with decomposition at about 180° C. It has the probable constitution:

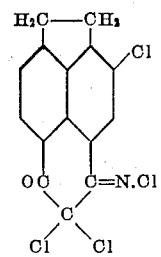

(6) 24 parts of the hydrochloride of the ketimide of acenaphth-peri-indandione of Example 4 are finely suspended in about 500 parts of water. At 25° C.-30° C. there are gradually added, drop by drop, 48 parts of bromine, while stirring. Stirring is continued at room temperature until the bromine has been completely consumed. The bromination product thus formed is filtered by suction and washed until neutral. It has the probable constitution:

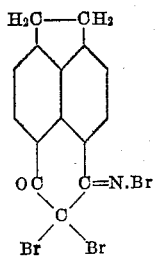

When dry, it is a yellowish-white powder which gradually turns brown on exposure to light. It melts at 169° C. with decomposition and dissolves in concentrated sulfuric acid to a brown solution. It dissolves in warm dilute caustic soda solution with evolution of a gas having a sweet odor.

We claim:

1. As new products, the compounds of the general probable constitution:

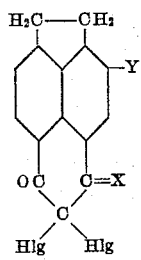

wherein Y represents hydrogen or chlorine, Hlg stands for a halogen of the group consisting of chlorine and bromine and X stands for oxygen or the group =N—Hlg (the meaning of Hlg being like above) however, all halogen atoms of the molecule being of the same kind.

2. As a new product, the compound of the probable formula:

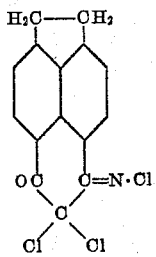

which melts at about 200° C. with evolution of gas, dissolves in concentrated sulfuric acid to a red solution and, when heated in the presence of dilute caustic soda solution, gradually dissolves.

3. As a new product, the compound of the probable formula:

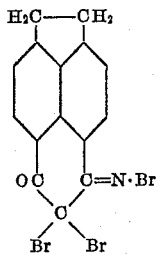

forming the dry state a yellowish white powder which gradually turns brown on exposure to light, melting at 169° C. with decomposition and dissolving in concentrated sulfuric acid to a brown solution and dissolving in warm caustic soda solution with evolution of a gas having a sweet odor.

4. As a new product, the compound of the probable formula:

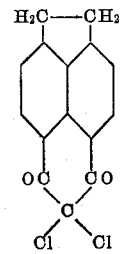

crystallizing from glacial acetic acid in quadrangular feebly yellow prisms, decomposing at temperatures from 160° C. and, after addition of dilute caustic soda solution and warming, dissolving with decomposition.

In testimony whereof, we affix our signatures.

WILHELM ECKERT.
HEINRICH SIEBER.